Sept. 27, 1927.
C. M. JONES
1,643,303
MUSIC SCALE INDICATING DEVICE
Filed Dec. 3, 1925
2 Sheets-Sheet 1
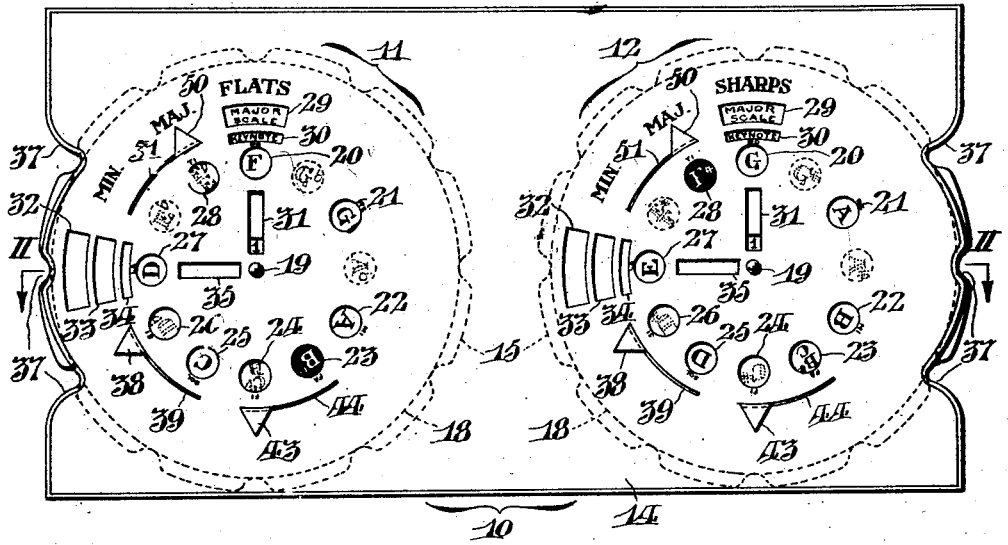
FIG. I.
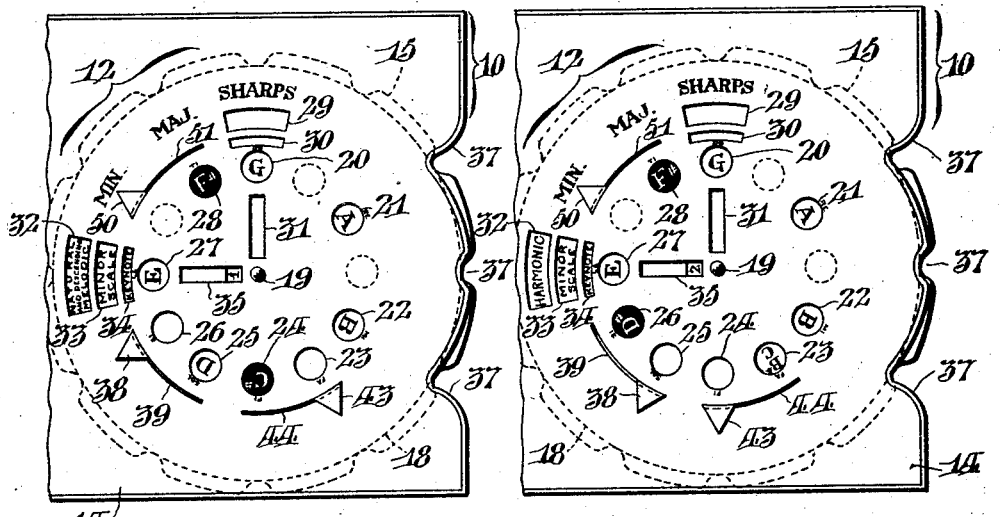
FIG. III.  FIG. IV.
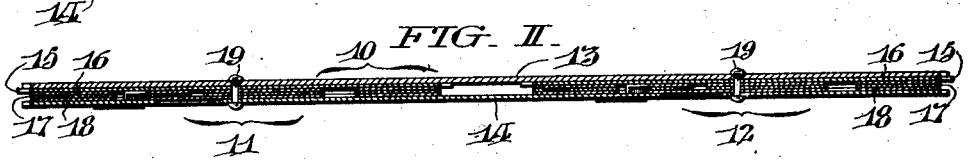
FIG. II.
WITNESSES
INVENTOR:
Charlotte M. Jones,
BY Fraley Paul
ATTORNEYS.

Sept. 27, 1927.
C. M. JONES
1,643,303
MUSIC SCALE INDICATING DEVICE
Filed Dec. 3, 1925      2 Sheets-Sheet 2
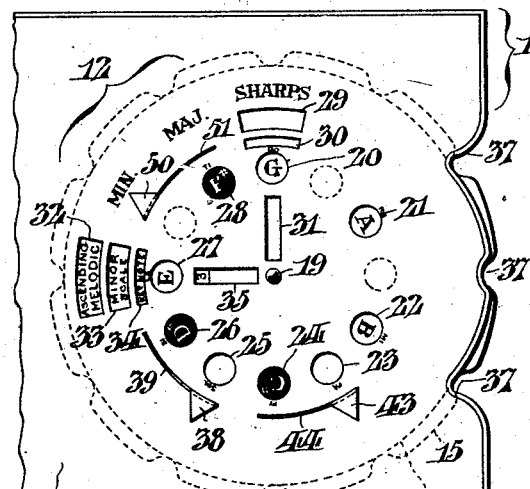
FIG. V.
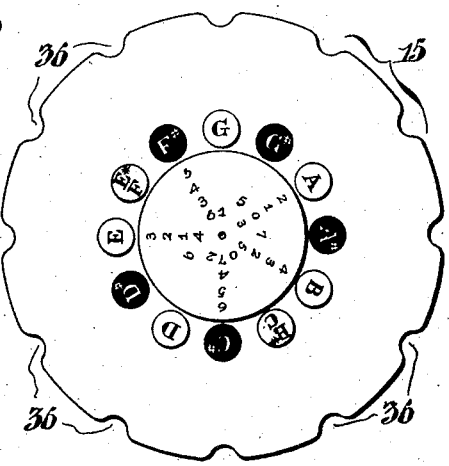
FIG. VI.
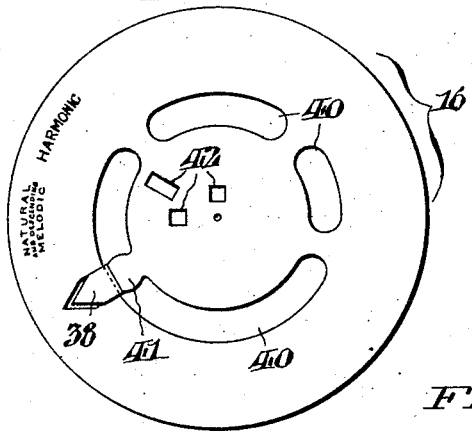
FIG. VII.
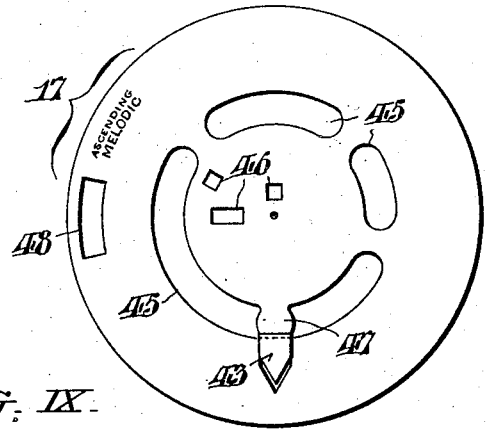
FIG. VIII.
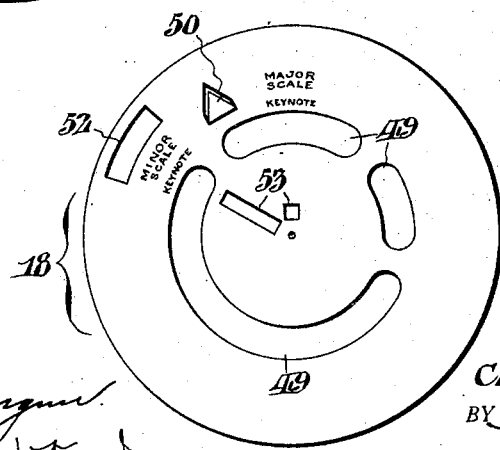
FIG. IX.
WITNESSES
INVENTOR:
Charlotte M. Jones,
BY Fraley & Paul
ATTORNEYS.

Patented Sept. 27, 1927.

1,643,303

UNITED STATES PATENT OFFICE.

CHARLOTTE M. JONES, OF PHILADELPHIA, PENNSYLVANIA.

MUSIC-SCALE-INDICATING DEVICE.

Application filed December 3, 1925. Serial No. 72,958.

The determination of the musical scales has always been a source of great difficulty to students of music, and this is more particularly true with regard to the minor scales on account of the perplexities arising from the different sequences employed viz: the natural, the harmonic, the melodic ascending and the melodic descending,—all of which, except the first, involving accidentals (extra sharps or flats as the case may be) not manifested in the key signatures. Various attempts have been made heretofore to construct scale indicating devices with a view toward facilitating a more ready understanding of the variations involved in the scale intervals and signatures, but such devices have been either too complicated and difficult to adjust, or not sufficiently comprehensive in their scope to furnish all the information necessary or desired.

The purpose of my invention is to overcome the objections heretofore advanced against the use of indicating devices of the type referred to, and with this aim in view, to provide a scale indicator which is extremely compact in form, inexpensive to manufacture, simple to operate, and capable of furnishing all the necessary data connected with any musical scale whatever, whether it be major or minor, or in sharps or flats.

With reference to the drawings herewith, Fig. I is a face view of a scale indicating device conveniently embodying my invention.

Fig. II is a sectional view of the same taken as indicated by the arrows II—II in Fig. I.

Figs. III, IV and V, illustrate different successive settings of the indicator for the sharp scales shown at the right hand end of Fig. I; and, Figs. VI, VII, VIII and IX, are separate detail views of the disks constituting the movable means enabling the successive settings shown in Figs. III, IV and V.

In carrying out my invention, I employ a chart 10 preferably of rectangular configuration, and sufficiently long to provide space for two contiguously allocated indicators 11, 12 respectively for flat and sharp scales. The chart 10 is composed of a backing sheet 13 (Fig. II) preferably of stout card board or celluloid, and a co-extensive frontal or facial sheet 14 which may be a similar, though comparatively thinner material. The indicators 11, 12 are identical (except in one particular to be hereinafter noted) and each comprises a group of disks 15, 16, 17 and 18 which are accommodated in the interval between the sheets 13, 14 at opposite ends of the chart 10, the components of the two disk groups being independently rotatable about central studs 19. In connection with each indicator 11, 12, the frontal sheet 14 has a series of display openings designated 20–28 inclusive, diversely spaced in a circle concentric with the rotative axis 19 of the disks 15—18. The frontal sheet 14 also has index openings 29—30 and 31 as well as 32—33—34 and 35 radially aligned with the display apertures 20 and 27, respectively. The innermost or largest disk 15 of the group associated with indicator 12 at the right, (see Fig. VI) has inscribed upon it, in any suitable manner, the twelve steps of the chromatic scale with the half-step intervals designated by the sharp symbol after the letters, and the series is arranged in a circle for selective display through the apertures 20–28 (also identified by the tonic solfa syllables do, re, mi, fa, (fi), sol (si), la ti) of the frontal plate 14 in a manner to be explained later. As a means to enhance the usefulness of my invention, the back grounds of the scale letters are made black and white so as to contrast with one another in correspondence with the white and black keys of a piano. In radial sequence with the letters, the disk 15 further bears numbers variously arranged as shown in Fig. VI for a purpose which will become apparent as the description proceeds. For convenience in rotating it, the disk 15 is circumferentially nicked as at 36, and its edge is exposed at the end of the chart where finger notches 37 are provided to limit the extent to which the disk may be shifted in opposite directions from the central one of said notches, at each actuation. The next disk 16 (Fig. VII) bears near its edge, side by side, the inscriptions "Natural and descending melodic" and "Harmonic" adapted to be exposed alternately through the index opening 32, and has a punched out pointer 38 provided for its actuation, said pointer projecting, for accessibility at the face of the chart 10, through an arcuate motion-limiting slot 39 in the frontal sheet 14. The disk 16, moreover, is cut out at intervals as at 40, to permit exposure of the scale letters on the bottom disk 15;

but at a region in line with the arrow 38, an obstruction 41 is left remaining, the same being of sufficient width to cover at a time, one or the other of two adjacent letters for a purpose to be later disclosed. The disk 16, furthermore, has openings 42, differently allocated radially, to permit exposure of certain of the numerical digits on the disk 15.

The next superimposed disk 17 (Fig. VIII) is generally similar to disk 16 in that it has a punched out actuating pointer 43 for projection through a second arcuate motion-limiting slot 44 in the frontal sheet 14 of the chart 10, cut outs 45 and openings 46 for exposure of the scale letters and the numbers on disk 15, as well as an obstruction 47 in line with its arrow 43. Near its periphery, the disk 17 bears the inscription "Ascending melodic", and circumferentially contiguous to such inscription has an opening 48 permitting alternate display of the inscriptions "Natural and descending melodic" and "Harmonic" of disk 16 through the opening 32 in the frontal sheet 14.

The last or uppermost disk 18 (Fig. IX) of the series is devoid of the obstructions of the two immediately preceding disks 16, 17 and does not therefore interfere at any time with exposure of the scale letters on the disk 15 through its openings 49. The disk 18, however, does have an actuator pointer 50 that projects through a third arcuate motion-limiting slot 51 in the frontal screen sheet 14, and bears at one (right) side of the pointer 50, one above the other, the inscriptions "Major scale" and "Keynote" for simultaneous exposure through the index openings 29, 30 in said frontal sheet 14. At the opposite (left) side of the pointer 50, the disk 18 bears the inscriptions "Minor scale" and "Keynote" for alternate exposure with its other inscriptions through the openings 32, 33 in the frontal sheet 14. Radially outward beyond the inscription "Minor scale", the disk 18 has a slot 52 permitting, with certain settings of the indicator, display of the legends on the disks beneath it, and near its center, orifices 53 enabling appearance of the numbers on the bottom disk 15 through the index openings 31, 35 of the chart 10.

In operation of the device, the use of the indicator 12 described in detail, is as follows: Assuming the pointers 38, 43, 50 to be in the position of Fig. I, the disk 15 may be rotated to alter the sequence of its letters relative to the "Major scale" and "Keynote" indications on disk 18 appearing through index openings 29, 30 and the sequential steps of any sharp major scale thus determined through exposure of the letters in the apertures 20–28 (with corresponding identification under the tonic solfa system of designation), the setting selected for the purpose of illustration herein showing the keynote as being "G" with "F" as the only sharp occurring in the scale. This information is emphasized by the fact that the background of "F" is black (as is the corresponding key on the piano), and by the number 1 (on disk 15) appearing through the facial opening 31 of the frontal sheet 14.

With all the information regarding the scale of G Major now acquired, the socalled relative minor scale may be immediately ascertained, simply by shifting the pointer 50 from the end of its slot 51 designated "Maj." to the opposite end marked "Min." as shown in Fig. III. As an incident to the movement imparted to the disk 18, the associated inscriptions "Major scale" and "Keynote" thereon are advanced beyond the index openings 29, 30, while its other associated inscriptions "Minor scale" and "Keynote" are concurrently advanced into registry with the index openings 33, 34 to indicate that E is now the keynote, that the scale is minor, with "F" still appearing as the only sharp to be found in the signature, this fact being further made apparent by appearance of the number 1 in the opening 35. The present setting also determines that the sequence of the letters exposed is that of the "Natural and descending melodic" (on disk 16) and "Minor scale" as concurrently displayed in the index opening 32, 33.

Now by shifting the pointer 38 to the opposite end of its slot 39 as shown in Fig. IV, movement thus induced in the disk 16 will result in substitution of the legend "Harmonic" thereon in the index opening 32, covering of the letter D in aperture 25 (Sol) (by obstruction 41 on said disk) and exposure of the letter D# in aperture 26 (Si), as well as exposure of the number 2 in opening 35. Thus the sequence of the "Harmonic minor" scale of E is disclosed as having two sharps, namely F# and D#.

Finally, in shifting the pointer 43 to the position of Fig. V, the movement imparted to the disk 17 will result in substitution of the legend "Ascending melodic" on disk 17 in the opening 32, covering of the letter C (B#) in aperture 23 (fa), and exposure of C# in the aperture 24 (fi), and in the appearance of the number 3 in the opening 35. Thus the "Ascending melodic" minor scale of E is disclosed as having the lettered sequence displayed with three sharps namely F# C# and D#, the latter two occurring as accidentals.

As previously stated, the indicator 11 is identical in construction with the indicator 12 described in detail, the only exception being that it is intended for use in determining major and minor keys involving flats,—hence the chromatic scale steps on its disk 15 are modified by the flat symbol as shown in Fig. I. The mode of operation of indicator 11 should be obvious from the foregoing without requiring separate and unnecessary repetitive explanation.

The use of two independent indicators 11, 12 is not absolutely essential to my invention; but the described arrangement obviates complications which would most likely tend to confuse with employment of a single letter bearing disk 15 having the chromatic scale steps modified by both sharp and flat symbols.

Having thus described my invention, I claim:

1. In a music scale indicating device, means to selectively vary the sequence of the scale letters, means to alternately designate the key tones of related major and minor scales, and means to modify certain of the scale letters in correspondence with designations of the natural, the harmonic, and melodic ascending and descending orders of minor scales.

2. In a music scale indicating device, the combination of means to selectively vary the sequence of the scale letters, means to alternately designate the key tones of related major and minor scales, means to numerically indicate the sharps or flats to be found in the common signatures of such related keys, means to modify certain of the scale letters in correspondence with designations of the natural, the harmonic, melodic ascending and melodic descending orders of the minor scales, and means to concurrently modify the numerical indications aforementioned in accordance with the number of additional sharps or flats occurring as accidentals to the key signature in the several diversified orders of the minor scales.

3. In a minor scale indicating device, the combination of means to selectively vary the sequence of the scale letters, and means to designate the scale steps by shade contrast in correspondence with the white and black keys of a piano.

4. In a music scale indicating device, the combination of a chart, and a disk revolvable to display the scale letters in varied sequence through a circular series of apertures in said chart and in contrasting shades corresponding with the white and black keys of a piano, and independently-movable means enabling conversion of the natural minor sequence of the scale letters either into the harmonic, the melodic ascending, or the melodic descending order.

5. In a music scale indicating device, the combination of a chart, a disk revolvable to display the scale letters through a circular series of apertures in the chart and in varied sequence relative to major and minor index openings also in said chart, an independently movable concentric disk with legends to alternately indicate the tonics of related major and minor keys through coordinated index openings aforesaid, and additional independently-movable concentric disks to alternately effect concealment and exposure of certain of the scale letters modified in accordance with requirements of the harmonic, melodic ascending, and melodic descending orders of the minor scale, concurrently with substitution of correspondingly modified legends through additional index openings respectively associated with the others aforesaid.

In testimony whereof, I have hereunto signed my name at Philadelphia, Pennsylvania, this 28th day of November 1925.

CHARLOTTE M. JONES.